(12) United States Patent
Bartolucci et al.

(10) Patent No.: US 12,395,324 B2
(45) Date of Patent: Aug. 19, 2025

(54) SYSTEMS AND METHODS FOR COMMUNICATION, STORAGE AND PROCESSING OF DATA PROVIDED BY AN ENTITY OVER A BLOCKCHAIN NETWORK

(71) Applicant: nChain Licensing AG, Zug (CH)

(72) Inventors: Silvia Bartolucci, London (GB); Pauline Bernat, London (GB); Daniel Joseph, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/091,199

(22) Filed: Dec. 29, 2022

(65) Prior Publication Data

US 2023/0216669 A1 Jul. 6, 2023

Related U.S. Application Data

(63) Continuation of application No. 16/642,873, filed as application No. PCT/IB2018/056576 on Aug. 29, 2018, now Pat. No. 11,546,144.

(30) Foreign Application Priority Data

Aug. 29, 2017 (GB) ...................................... 1713800

(51) Int. Cl.
*H04L 9/08* (2006.01)
*H04L 9/00* (2022.01)
(Continued)

(52) U.S. Cl.
CPC ............ *H04L 9/085* (2013.01); *H04L 9/0637* (2013.01); *H04L 9/30* (2013.01); *H04L 9/3247* (2013.01); *H04L 9/50* (2022.05); *H04L 2209/463* (2013.01)

(58) Field of Classification Search
CPC .......... H04L 2209/38; H04L 2209/463; H04L 2209/56; H04L 9/3239; H04L 9/50;
(Continued)

(56) References Cited

U.S. PATENT DOCUMENTS 6,845,447 B1    1/2005  Fujioka et al.
10,505,723 B1 *  12/2019  Griffin .................... H04L 9/085
(Continued)

FOREIGN PATENT DOCUMENTS

KR      20120028160 A  *  3/2012
RU       2015157157 A      7/2017
(Continued)

OTHER PUBLICATIONS

Zhao et al., "How to Vote Privately Using Bitcoin," 2015 (Year: 2015).*

(Continued)

*Primary Examiner* — Jeremy S Duffield
(74) *Attorney, Agent, or Firm* — Tarolli, Sundheim, Covell & Tummino LLP

(57) ABSTRACT

A computer-implemented method of making a decision on a blockchain is provided. The method comprises providing a blockchain voting commitment transaction (2) redeemable by means of a first signature ($\sigma(A_m)$, $\sigma(B_m)$) associated with a selection (A, B) and a second signature ($\sigma(A)$, $\sigma(B)$) associated with the selection, providing each of a plurality of participants ($U_i$) with at least one share ($k_{A,i}$, $k_{B,i}$) of at least one respective secret value ($k_A$, $k_B$) wherein a threshold number of shares is required in order to execute said second signature, and submitting the blockchain voting commitment transaction (2) to the blockchain.

17 Claims, 7 Drawing Sheets

(51) Int. Cl.
   *H04L 9/06* (2006.01)
   *H04L 9/30* (2006.01)
   *H04L 9/32* (2006.01)

(58) Field of Classification Search
   CPC ... H04L 9/3247; H04L 9/0637; H04L 9/0643;
      H04L 9/30; H04L 9/085; H04L 9/3236;
      H04L 9/3242; H04L 67/10; H04L
      67/1097; G06Q 40/04; G06Q 2220/00;
      G06Q 20/065; G06Q 20/3829; G06Q
      20/389; G06Q 20/3825; G06Q 20/3827;
      G06Q 20/401; G06Q 2230/00; G06F
      16/27; G07C 13/00
   See application file for complete search history.

(56) References Cited

U.S. PATENT DOCUMENTS

| | | | | |
|---|---|---|---|---|
| 11,164,165 | B1* | 11/2021 | Andreev | G06Q 20/02 |
| 2010/0180116 | A1* | 7/2010 | Coan | H04L 9/3249 |
| | | | | 713/168 |
| 2015/0172049 | A1* | 6/2015 | Chida | H04L 9/0869 |
| | | | | 380/46 |
| 2016/0027229 | A1 | 1/2016 | Spanos et al. | |
| 2017/0109955 | A1 | 4/2017 | Ernest et al. | |
| 2017/0187535 | A1* | 6/2017 | Middleton | G06Q 20/10 |
| 2017/0221052 | A1 | 8/2017 | Sheng et al. | |
| 2017/0352219 | A1* | 12/2017 | Spanos | G07C 13/00 |
| 2019/0007205 | A1* | 1/2019 | Corduan | H04L 9/0825 |

FOREIGN PATENT DOCUMENTS

| | | |
|---|---|---|
| WO | 2016022864 A2 | 2/2016 |
| WO | 2017044554 A1 | 3/2017 |

OTHER PUBLICATIONS

Stathakopoulou et al., "Threshold Signatures for Blockchain Systems," Apr. 4, 2017 (Year: 2017).*
Ruffing T., Moreno-Sanchez P., Kate A. (2014) CoinShuffle: Practical Decentralized Coin Mixing for Bitcoin. In: Kutylowski M., Vaidya J. (eds) Computer Security—ESORICS 2014. ESORICS 2014. Lecture Notes in Computer Science (Year: 2014).*
Antonopoulos, "Mastering Bitcoin—Unlocking Digital Cryptocurrencies," O'Reilly Media, Inc., Dec. 20, 2014, 282 pages.
Satoshi et al., "Connection Limits," Bitcoin Forum, Aug. 9, 2010, https://bitcointalk.org/index.php?topic=741.0;prev_next=prev, 2 pages.
Nakamoto, "Bitcoin: A Peer-to-Peer Electronic Cash System," Bitcoin, Oct. 31, 2008, https://bitcoin.org/bitcoin.pdf, 9 pages.
Coinpit, "The Right Way to Multisig," retrieved from https://www.coinpit.io/2016/08/07/the-right-way-to-multisig/, Aug. 7, 2016, 1 page.
Geer et al. "Split-and-Delegate: Threshold Cryptography for the Masses," retrieved from https://pdfs.semanticscholar.org/14a5/94efcb8be4119111c865a16a6772cdb0b8d5.pdf, Mar. 2002, 16 pages.
International Search Report and Written Opinion mailed Oct. 30, 2018, Patent Application No. PCT/IB2018/056576, 12 pages.
Kulyk et al., "Enabling Vote Delegation for Boardroom Voting," retrieved from http://fc17.ifca.ai/voting/papers/Voting17_kulyk.pdf, 2017, 15 pages.
McCorry et al., "A Smart Contract for Boardroom Voting with Maximum Voter Privacy," retrieved from https://eprint.iacr.org/2017/110.pdf, 2017, 18 pages.
Ruffing et al., "CoinShuffle: Practical Decentralized Coin Mixing for Bitcoin," European Symposium on Research in Computer Security, Sep. 7, 2014, Sep. 7, 2014 (revised Aug. 14, 2014), 21 pages.
Stathakopoulou et al., "Threshold Signatures for Blockchain Systems," IBM Research Report, Apr. 4, 2017, 42 pages.
Tsouvelakis, "Designing Secure and Fair Protocols with Bitcoin," retrieved from http://webcache.googleusercontent.com/search?q=cache:EI85pM9RpKcJ:artemisnew. cslab.ece.ntua.gr:8080/jspui/bitstream/123456789/7995/1/DT2016-0312.pdf+&cd=3&hl=en&ct=clnk&gl=uk, 2016, 101 pages.
UK Commercial Search Report mailed Jan. 12, 2018, Patent Application No. GB1713800.9, 6 pages.
UK IPO Search Report mailed Feb. 19, 2018, Patent Application No. GB1713800.9, 7 pages.
Zhao et al., "How to vote privately using bitcoin," International Conference on Information and Communications Security, Dec. 9, 2015, 15 pages.
Canetti, R. et al., "Adaptive Security for Threshold Cryptosystems", 1999, In: Wiener, M. (eds) Advances in Cryptology, CRYPTO' 99, Lecture Notes in Computer Science, vol. 1666, pp. 98-116.
Peng, Q. et al., "A Publicly Verifiable Secret Sharing Scheme Based on Multilinear Diffie-Hellman Assumption", Nov. 2016, vol. 18, No. 6, 9 pages.
Sampigethaya, K. et al., "A Framework and Taxonomy for Comparision of Electontric Voting Schemes", 2006, vol. 25, Issue 2, 17 pages.
Chillotti, I. et al., "A Homomorphic LWE Based E-Voting Scheme", 2016, In: Takagi T. (eds) Post-Quantum Cryptography. PQCrypto 2016. Lecture Notes in Computer Science, vol. 9606, 276 pages.
Nair, et al., "An Improved E-voting Scheme Using Secret Sharing Based Secure Multi-party Computation", Eighth International Conference on Computer communication networks, ICCN, Feb. 26, 2015, 10 pages.

* cited by examiner

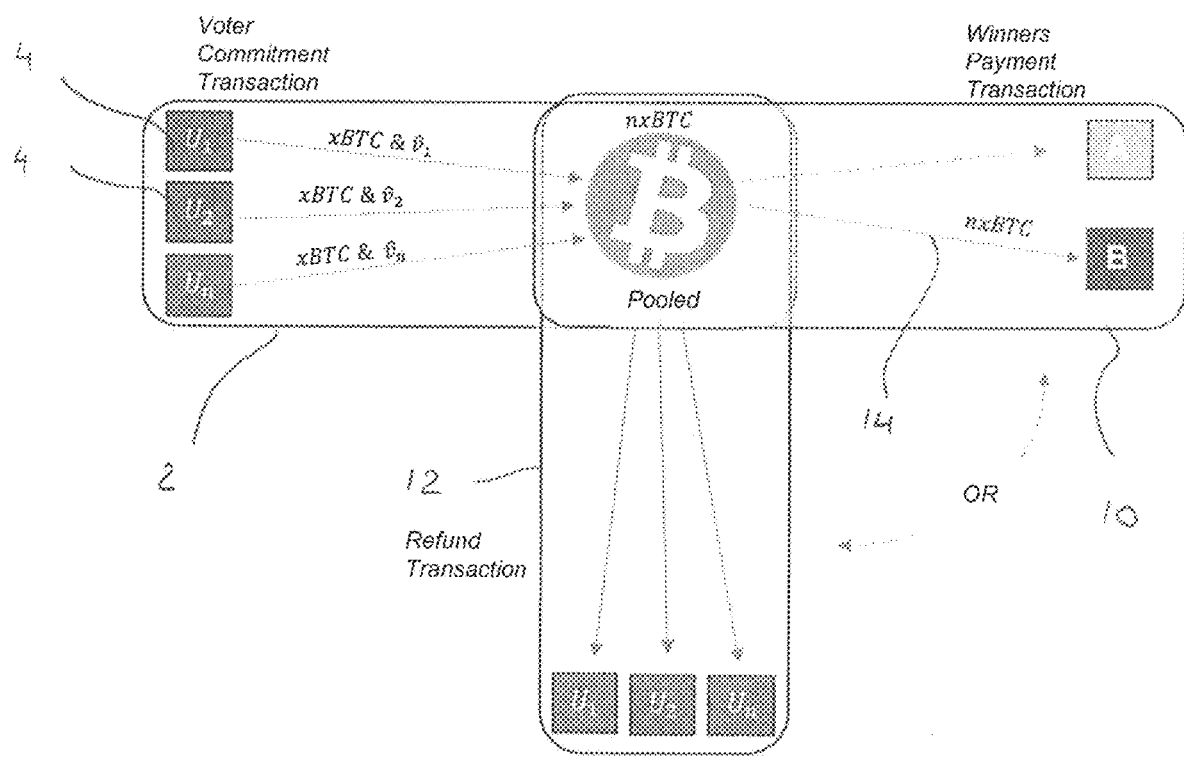
Figure 1: Three Transactions of TSSV Protocol and their Relationship to the Pooled Bitcoin Commitments Figure 2: Necessary Votes and Degree of Polynomial of Winning Candidates

| # of voters | # votes winning candidate (min) | degree of polynomial |
|---|---|---|
| 2 | 2 | 1 |
| 3 | 2 | 1 |
| 4 | 3 | 2 |
| 5 | 3 | 2 |
| 6 | 4 | 3 |
| 7 | 4 | 3 |
| 8 | 5 | 4 |

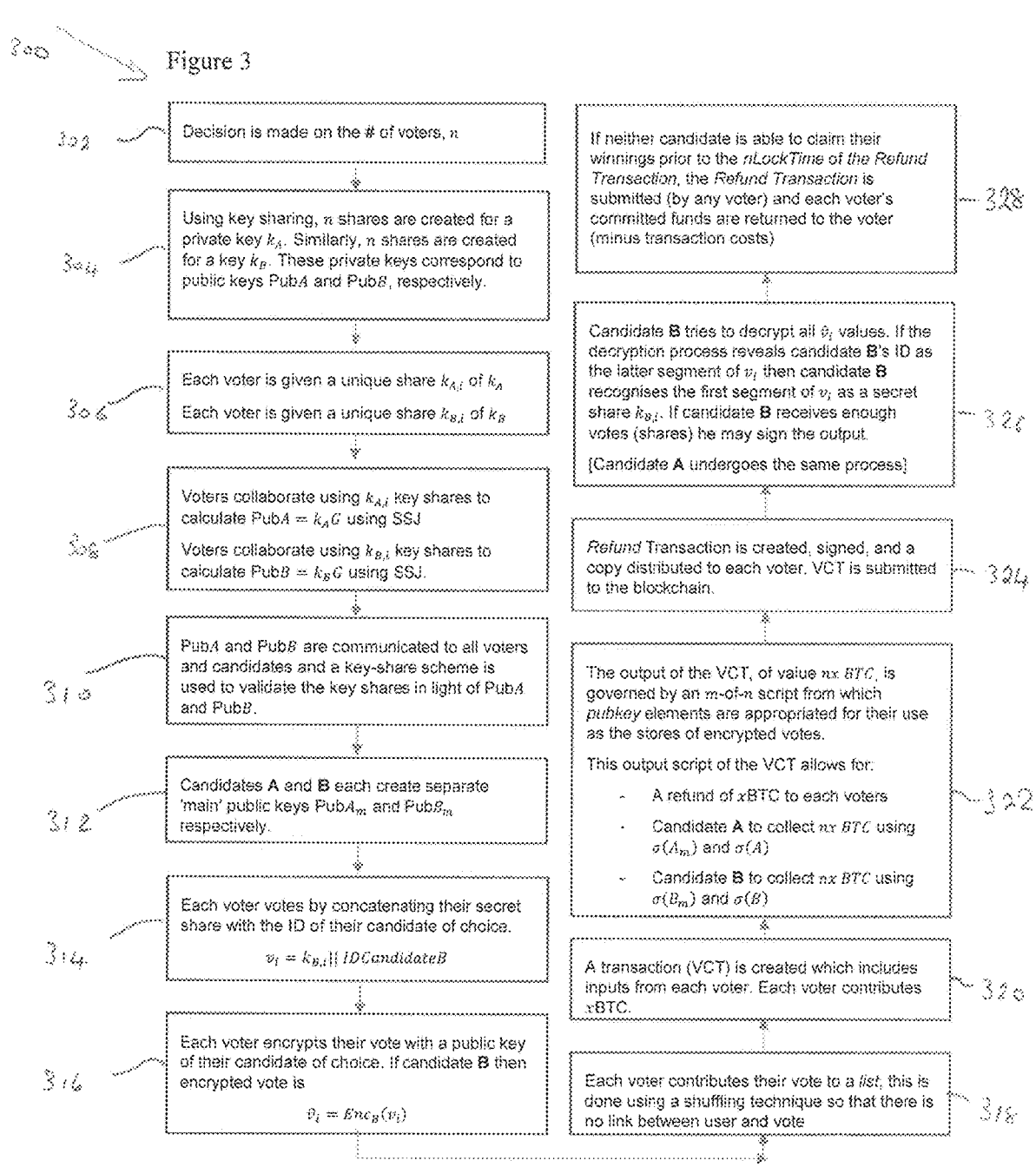

Figure 4: Voting Commitment Transaction
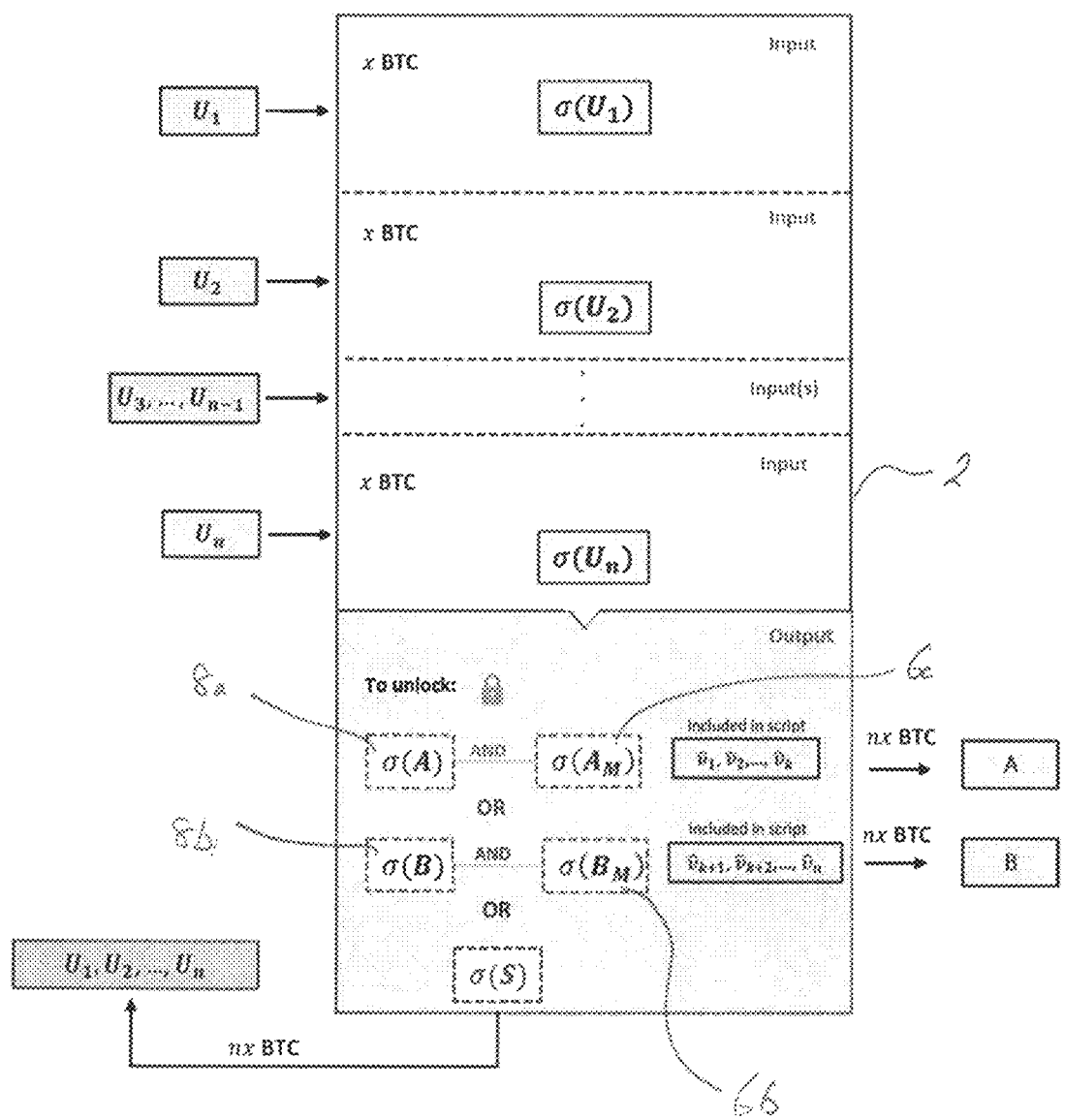

Figure 5: Winning Payment Transaction
(a) If Candidate A wins
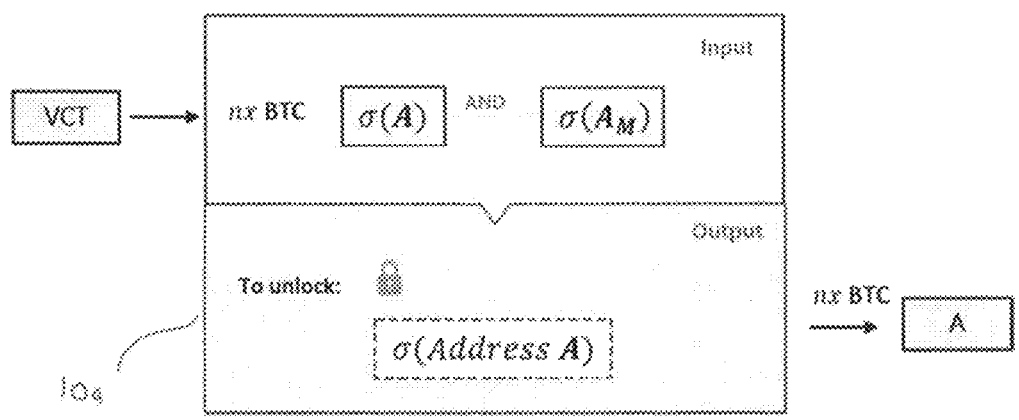
(b) If Candidate B wins
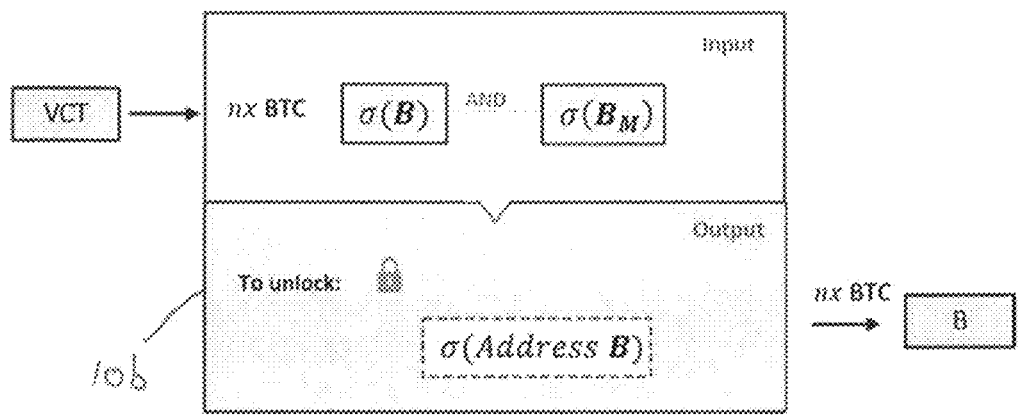

Figure 6: Refund Transaction
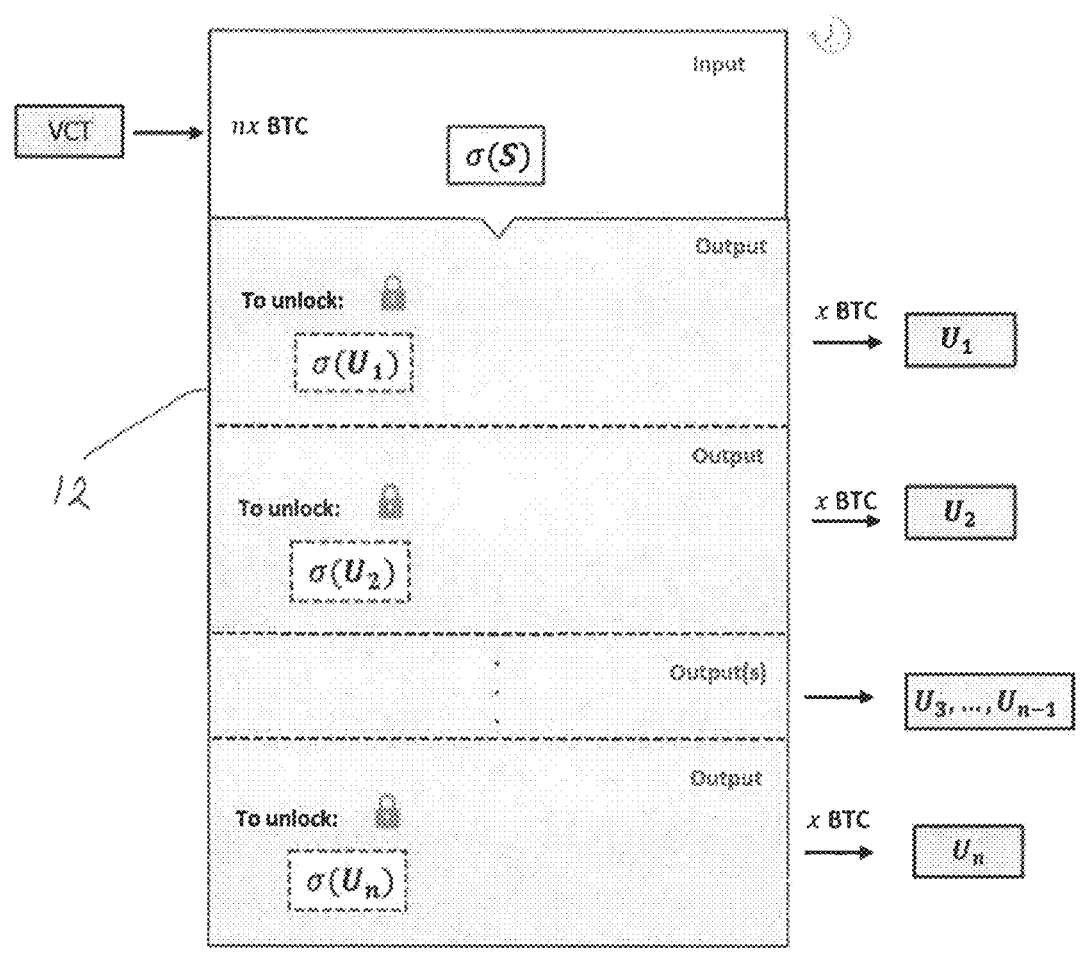

SYSTEMS AND METHODS FOR COMMUNICATION, STORAGE AND PROCESSING OF DATA PROVIDED BY AN ENTITY OVER A BLOCKCHAIN NETWORK

CROSS REFERENCE TO RELATED APPLICATIONS

This application is a continuation of U.S. patent application Ser. No. 16/642,873, filed Feb. 27, 2020, entitled "SYSTEMS AND METHODS FOR COMMUNICATION, STORAGE AND PROCESSING OF DATA PROVIDED BY AN ENTITY OVER A BLOCKCHAIN NETWORK," which is a 371 National Stage of International Patent Application No. PCT/IB2018/056576, filed Aug. 29, 2018, which claims priority to United Kingdom Patent Application No. 1713800.9, filed Aug. 29, 2017, the disclosures of which are incorporated herein by reference in their entirety.

This invention relates generally to cryptographically-enforced data recording and processing systems. In particular, the invention relates to a technical solution for communicating, recording and/or storing data provided to the system by an entity via or over a blockchain network. The data may be indicative of, for example, a selection, choice, feedback and/or decision. The invention provides techniques for secure storage and communication of such data between entities over the blockchain network, and ensures the integrity of the data that is transferred and used post-transfer. It also alleviates issues relating to identification of the source of such data on a network, to prevent authorised activity. The invention is suited for, (but not limited to) voting, electronic feedback submission, or counting applications, or other applications where data integrity, source concealment and enforcement of usage quotas or limits may be of importance.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be (i) validated by the first node that receives the transaction-if the transaction is validated, the node relays it to the other nodes in the network; (ii) added to a new block built by a miner; and (iii) mined, i.e. added to the public ledger of past transactions. Once recorded, the data in any given block cannot be altered retroactively without altering all subsequent blocks and a collusion of the network majority.

Transactions involve the transfer of one or more tokens from one node to another node. Tokens may represent future control of network resources. In some cases, the tokens may represent an asset or value, but not necessarily. For example, in some cases, the tokens may be understood as a cryptocurrency. However, the present application is not limited to implementations in the context of cryptocurrency and is more broadly understood as relating to blockchain networks for distributed transfer of control tokens.

A blockchain serves as a public ledger that can record transactions between parties in a verifiable and permanent way. Blockchains possess numerous properties, such as irrevocability of information stored on-chain and trust established through decentralized consensus, which make them suitable for use in various applications. One such application is electronic voting. It should be noted that the term "voting system" is not limited herein to political or administrative contexts, but is used in a generic sense to simply mean a system which enables a selection, choice, decision or parameter (i.e. a vote) to be transferred, recorded, stored, processed and/or registered in some way. Thus, the invention relates to improved communication, storage and security of data between entities.

Many types of computer-implemented systems need to enable an indication of a choice/decision, or other data, to be communicated across a network, so that the data can be acted upon or processed in some way. In many cases, it is desirable to be able to enforce certain rules or criteria relating to the number of times that a selection can be made. In other words, there may be a quota or limit to the number of times a selection or choice can be made. For the sake of convenience and ease of reference only, we may refer to such a system as an "e-voting" system but this should not be construed as limiting the invention to political or administrative contexts. Alternatively, the term "data recording system" may be used to reflect the wider applicability of the invention. The invention is not limited with regard to the type or nature of data received, recorded and stored.

Recently, there has been a growing interest in exploiting online technologies to design protocols for secure electronic voting. The goal of these endeavours is to allow a group of users to make a shared decision based on individual preferences, preferences which are kept secret. Challenges related to electronic voting include denying a second party the ability to determine a user's vote, ensuring the irrevocability of a vote, as well as providing necessary transparency throughout the process to garner voter trust in the process.

The introduction of the blockchain as a basis of cryptocurrency protocols provides for the exploitation of the immutability and transparency properties of these distributed ledgers. These ledgers in combination with available cryptographic solutions present a unique opportunity to use the blockchain as an effective replacement of the trusted third parties typically present in electronic (servers) and non-electronic voting processes.

The wide adoption by the global community of Information Technology, and the Internet in particular, for usage in a variety of pre-existing services, inevitably led to electronic voting considerations. While web based polls are common method of garnering user sentiment, there has been notable opposition the usage of electronic voting for elections related to public office and other contexts. In the face of this resistance, for electronic voting to achieve greater success, proposed systems will be tasked with satisfying a variety of socio-technical hurdles.

Some of the criteria deemed desirable which electronic voting systems must strive to achieve are:

Correctness: all votes correctly taken into account; i.e. invalid or unauthorized ballots excluded while all valid votes count toward the final result.

Privacy: the vote not known to participants different from the voter himself.

Prevent double voting: no vote submitted twice, i.e. an attacker should not be able to copy a vote submitted by another voter already.

Eligibility: only authorized voters can cast their ballot in the protocol.

Verifiability to verify that a vote has been correctly taken into account.

The advent of blockchain technology via the cryptocurrency Bitcoin has presented an opportunity for utilising the blockchain's properties in the construction of electronic voting protocols. Blockchain itself is an immutable public ledger that removes the need for a trusted third party in the validation of transactions. These characteristics are thought to be applicable to electronic voting by accommodating and/or enabling one or more of the five previously stated criteria.

The blockchain constitutes a suitable environment where votes and opinions may be publicly and permanently recorded in order to avoid manipulation of any kind of the votes. Despite this ability, there are numerous issues that are to be addressed in order to create a secure voting on the blockchain. This ranges from preventing multiple ballots submissions to maintaining the users' privacy and credentials checking.

Decentralisation is one of the biggest challenges for online e-voting and rating's protocols: usually existing solutions are constructed in such a way to prevent abuse but they rely on a central authority to validate and take into account votes or feedback.

The central authority may use different cryptographic primitives, such as blind signatures and homomorphic encryption, to add secrecy and eligibility's verification to the ballot vote. In Chaum's protocol participants send their votes to mixing authorities that, using the Mix Nets set-up, reshuffle and encrypt the vote before their broadcast, in order to disguise vote-voters link. This is described in greater detail in Chaum, D. L. (1981)—"Untraceable electronic mail, return addresses, and digital pseudonyms", Communications of the ACM, 24 (2), 84-90.

Thus, it is desirable to provide a Bitcoin-compatible voting protocol where voters utilise a Bitcoin transaction to cast their vote for their preferred candidate—among two possible options—as well as commit an amount of bitcoins or tokens to the winning candidate. This protocol utilises a distributed key shares scheme to facilitate the rewarding of the candidate who would have won sufficient votes.

Such an improved solution has now been devised.

Thus, in accordance with the present invention there are provided methods as defined in the appended claims.

In accordance with the invention there may be provided a computer-implemented method of voting on a blockchain, comprising: providing each of a plurality of voters with at least one share of a secret value, wherein each secret value is associated with a selection; providing a commitment transaction redeemable to reveal a winning selection upon provision of both: (i) a first signature determinable from a secret value of the winning selection; and (ii) a second signature indicative of an identity of the winning selection; and submitting the commitment transaction to the blockchain, wherein the secret value of the winning selection is determinable using a number of voting items provided by at least one voter, each of the voting items comprising at least one share, and wherein the number exceeds a predetermined value.

By providing such a method, users of the blockchain are able to cast votes securely in a tamper-proof first-past-the-post style voting system.

At least one voter may add to the commitment transaction at least one signed input representative of a cryptographic asset.

This provides the advantage of disincentivising frivolous or malicious participation in the voting process.

The method may further comprise the step of providing a return transaction redeemable, upon satisfaction of a lock-time condition, to return at least a portion of the cryptographic asset to at least one voter.

This provides the advantage of a mechanism for minimising loss of funds in the event of no winning selection.

The commitment transaction may comprise an m-of-n multisignature redeem script, and at least one voting item may be added to the redeem script.

This provides the advantage of enabling the storage and public visibility of the at least one voting item.

At least one voting item may be encrypted with a first public key of at least one selection.

This provides the advantage of enabling only the chosen selection to decrypt the voting item and gain access to the share.

At least one voting item may comprise at least one identification item identifying at least one selection.

Upon successful decryption of the voting item, this provides the advantage of increasing the ease with which the share can be subsequently identified.

At least one voting item may comprise a concatenation of at least one share and at least one identification item.

The step of providing the shares to the voters may comprises at least one of: (i) a dealer entity providing the shares to the voters; and (ii) the voters generating shares.

This enables both a dealer-based voting system and a dealer-less voting system, thereby increasing the versatility of the voting method.

The method may further comprise the step of obscuring which voter provides which voting item prior to submission of the commitment transaction to the blockchain.

This prevents a voter from being identified from their voting item, thereby providing the advantage of increasing the security of the voting method.

The method may further comprise the step of providing a redemption transaction arranged to redeem the commitment transaction.

This provides the advantage of a simple way to indicate to the voters the identity of the winning selection.

The method may further comprise the step of validating at least one share using at least one second public key.

This enables a voter to check the validity of a share, thereby providing the advantage of increasing the robustness of the voting method.

The plurality of voters may collaborate in combining at least one subset of shares to determine at least one said second public key.

This provides a means of decentralising at least a portion of the voting method, thereby providing the advantage of further increasing the versatility of the method.

Additionally or alternatively, in accordance with the invention there may be provided a computer-implemented method of determining a winning selection of a vote on a blockchain, comprising the steps of: determining at least one share of at least one secret value from at least one voting item, wherein each secret value is associated with a selection; determining a secret value of the winning selection using a number of shares thereof provided by the at least one voting item, wherein the number exceeds a predetermined value; determining a first signature from the secret value of the winning selection; and redeeming a commitment transaction to reveal the winning selection by providing both: (i) the first signature; and (ii) a second signature associated with an identity of the winning selection.

By providing such a method, the identity of a winning selection of a voting method carried out on a blockchain can be determined and checked in a secure and transparent manner.

The invention also provides a system, comprising:
a processor; and
memory including executable instructions that, as a result of execution by the processor, causes the system to perform any embodiment of the computer-implemented method described herein.
The invention also provides a non-transitory computer-readable storage medium having stored thereon executable instructions that, as a result of being executed by a processor of a computer system, cause the computer system to at least perform an embodiment of the computer-implemented method described herein.

The present application describes systems and methods which facilitate secure, cryptographically enforced and efficient implementation of schemes for encrypting, validating, and broadcasting data items that are submitted by users to a blockchain. The users may, in some useful application, be participants in a voting or feedback platform. In some implementations, the present application provides protocols that are designed to prevent submissions of data from malicious actors. This can preserve the integrity and reliability of results which are produced by the system based on the received data.

These and other aspects of the present invention will be apparent from and elucidated with reference to, the embodiment described herein. An embodiment of the present invention will now be described, by way of example only, and with reference to the accompanying drawings, in which:

FIG. 1 illustrates a schematic showing the interaction of three transactions of the present invention;

FIG. 2 is a table showing the relationship between a number of voters, a threshold number of votes required for a selection to be determined a winner, and a degree of a polynomial in accordance with the invention;

FIG. 3 shows a flow chart illustrating the present invention;

FIG. 4 shows a voting commitment transaction;

FIG. 5 shows two winner payment transactions;

FIG. 6 shows a refund transaction; and

Figure 7:
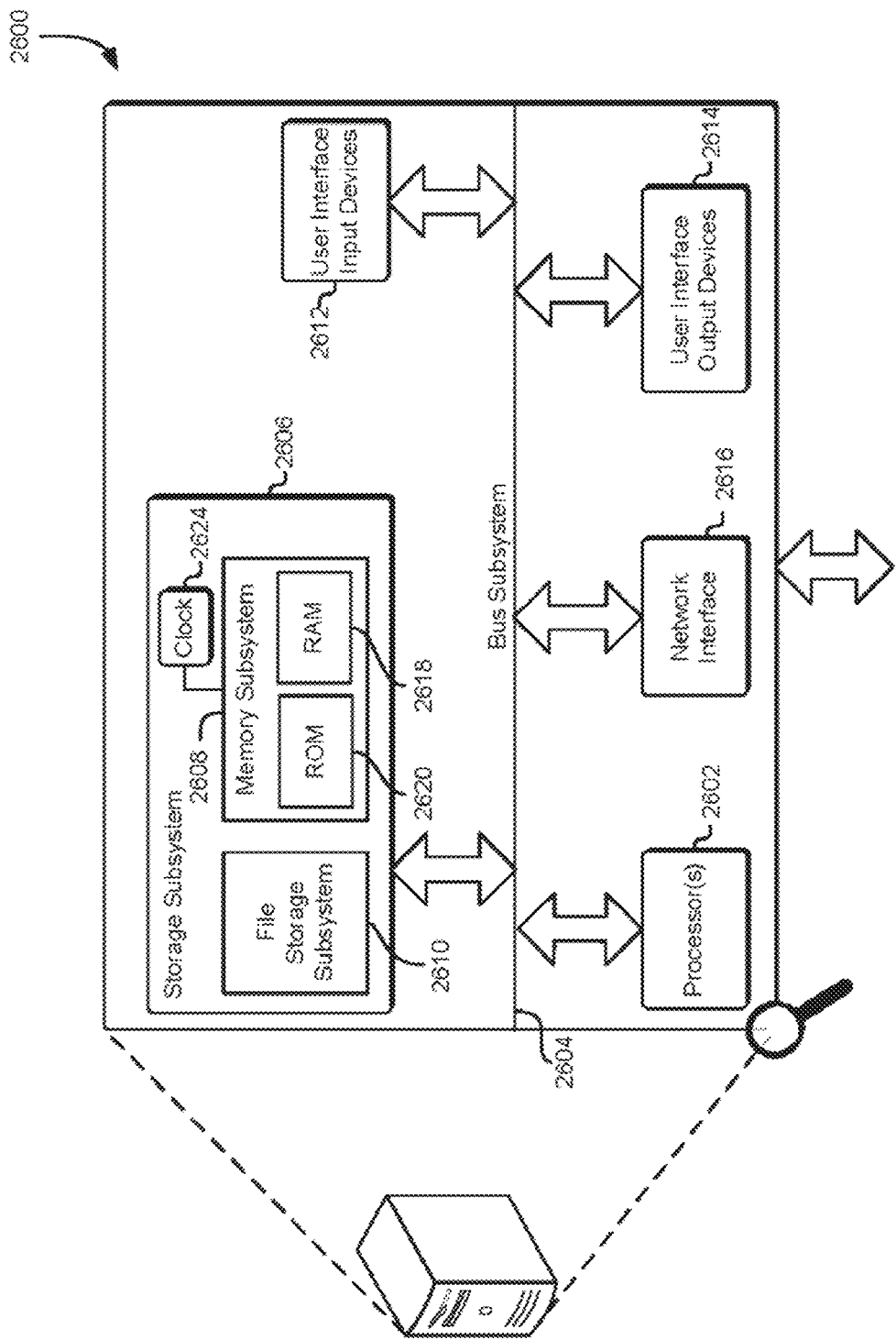
FIG. 7 is a schematic diagram illustrates a computing environment in which various embodiments can be implemented.

The present application describes a system of Threshold Secret Share Voting (TSSV), which is a system where a set of voters is asked to choose between a pair of candidates where the winning candidate receives x BTC committed by each voter. The winning candidate must receive both a majority of votes and a number of votes past a specified threshold. The TSSV protocol utilises the distribution of private key shares, and is designed such that any bitcoins committed are recoverable if one or more participants act maliciously or do not follow protocol expectations.

The abbreviation "BTC" may be used herein as a shorthand for any variation of the Bitcoin protocol. It should not be interpreted as being restricted to or indicative of any one particular Bitcoin-related protocol.

Secret Sharing

A threshold cryptosystem is defined by (t; n)—threshold, where n is the number of parties and t+1 is the minimal number of parties required to reconstruct a secret. Secret Sharing schemes are examples of threshold cryptosystems, whereby a secret k is divided among n players, such that at least t+1 participants are required to collaborate in order to reconstruct k. The knowledge of any t pieces of the secret k leaves the latter undetermined.

Shamir's secret sharing (or SSS) is based on polynomial interpolation and without loss of generality the secret is assumed to be an element of a finite field F. The scheme comprises a dealer (dealerless versions also exist), a set of n participants $U_1, \ldots, U_n$ and an access structure A, i.e. the groups of players able to reconstruct the secret. This is described in greater detail in Shamir, A. (1979) "How to share a secret", *Communications of the ACM*, 22 (11), 612-613.

For Shamir's solution, an arbitrary random secret is stored as f(0) in a t degree polynomial f(x) and only player i can calculate its share $f(x_i)$. If t+1 out of n players collaborate, they can reconstruct any point on f(x), with their shares (of the key k) $k_1, k_2, \ldots, k_n$ which correspond to $f(x_1), f(x_2), \ldots, f(x_n)$ using Lagrange Polynomial Interpolation.

Using the Lagrange Polynomial Interpolation, a function $f(x)$ with degree t can be reconstructed with t+1 points $$p=\{x_1,f(x_1),(x_2,f(x_2), \ldots ,(x_{t+1},f(x_{t+1}))\}$$

$$f(x) = \sum_{i \in p} f(x_i) \prod_{j \in p, j \neq i} \frac{x - x_j}{x_i - x_j} = \sum_{i \in p} f(x_i) b_{i,p}(x)$$

where $$b_{i,p}(x) = \prod_{j \in p, j \neq i} \frac{x - x_j}{x_i - x_j}$$

Note that $b_{i,p}(x_i)=1$ and $b_{i,p}(x)=0$.

In the presence of a dealer the dealer simply selects a secret $a_0=k$, assumed to be an element of the finite field F of size p (p prime), and randomly pick t−1 positive integers $a_1, \ldots, a_{t-1}$, which represent the coefficient of the polynomial $f(x)=a_0+a_1x+a_2x^2+\ldots$. The dealer then computes n points $(x_i, f(x_i))$ belonging to the polynomial and distribute it to the participants.

In the dealerless shares distribution phase:
1. Each player $U_i$ is assigned $x_i$ which is known by everyone. Each $x_i$ has to be unique.
2. Each player $U_i$ generates a random polynomial $f_i(x)$ with degree t.

3. Each player $U_i$ secretly sends (encrypted with the recipients' public key) every other player their respective point on the polynomial, $f_i(x_j)$ mod n.
4. Each player $U_i$ sums all their received $f_1(x_i)$, $f_2(x_i)$, ... $f_p(x_i)$ (all mod n, where n is the order of the group generated by the point G on the elliptic curve) to form $$k_i = f(x_i) \bmod n$$

which is a share on the polynomial f(x) mod n.

An important element of the threshold signature calculations is the determination of k×G where k is the secret key and G is a point on the Elliptic Curve.

If f(x) is a t-degree polynomial, secret k can be interpolated by $k = \Sigma_{i \in \pi} b_{i,\pi} k_i$ where π is a size t+1 subset of shares $k_a, k_b, \ldots, k_t, k_{t+1}$ and b is an interpolating factor. It is a group of t+1 players collaborating to calculate k×G without revealing their share $k_i$. k is the x=0 point on a t-degree polynomial Each player $U_i$ calculates a part $b_{i,\pi} k_i \times G$ All players in π add their part together (reconstructing the secret k via Lagrange interpolation) giving:

$$b_{a,\pi} k_a \times G + b_{b,\pi} k_b \times G + \ldots + b_{t+1,\pi} k_{t+1} \times G = k \times G$$

This process of calculating Q=kG is referred to as Secret Share Joining.

Public Verifiable Secret Sharing Schemes

In the TSSV protocol it is desirable that voters be able to verify that they are given correct secret shares. Indeed, if inconsistent shares are distributed among the players, the incorrect share/votes of the voters would fail to contribute to the voter's preferred candidate. For the shares verification we will employ the Publicly Verifiable Secret Sharing scheme (PVSS) which allows voters to verify their own shares as well as the shares of the other voters. This is described in greater detail in Stadler, M. (1996 May), "Publicly verifiable secret sharing"—*International Conference on the Theory and Applications of Cryptographic Techniques* (pp. 190-199), Springer Berlin Heidelberg.

In a PVSS scheme, each participant $U_i$ has a decryption function $D_i$, which is able to access the information encrypted with the corresponding public encryption function $E_i$. In this way, the dealer can use the public encryption function to distribute the shares and publish them in this form $$K_i = E_i(k_i), i = 1, \ldots, n.$$

The encrypted shares can be, hence, publicly verified by any interested individual as we shall detail below. The participants can, not only verify their own shares, but anybody can verify that the participants received correct shares, i.e. whether the dealer was honest or not.

The main steps of the protocol are:
1—Secret sharing: the dealer runs an algorithm Share $(k) = (k_1, \ldots, k_n)$ to compute the shares and distribute them among the participants.
2—Reconstruction: participants can reconstruct the secret by running the algorithm Recover, such that Recover $(\{D_i(K_i)|i \in A\}) = k$.
3—Verification: an algorithm PubVerify is used to validate the encrypted shares. If we run the algorithm PubVerify$(\{K_i|i \in A\}) = 1 \rightarrow$ Recover$(\{D_i(K_i)|i \in A\}) = u$ and u=k then the dealer is honest and the shares are consistent.

The PVSS scheme can be interactive or non-interactive depending on necessity in the recovery phase.

De-Linking Outputs from Inputs in Bitcoin Transaction

The design of the voting protocol is such that the transaction that pays the winning candidate also contains the votes of the individual voters. In order for participants in the voting protocol, the candidates, or any external party, not to know the vote (and/or its encrypted value) of any another participant, it is important to incorporate a solution allowing each participant to contribute their encrypted vote without any other participant being able to link this encrypted value to its voter source.

This requirement is similar to that of the popular Bitcoin coin mixing solution CoinJoin, which is described in greater detail at Maxwell, G. (2013 August)—"CoinJoin: Bitcoin privacy for the real world"—*Post on Bitcoin Forum*. In CoinJoin each of a set of participants contribute and represent one of the inputs of a Bitcoin transaction; this transaction contains multiple outputs where each of the output addresses is provided by participants of the inputs. In order to strengthen the anonymity of the coin mixing process it is important to delink the input participant from their output address. To address this issue, a variety of shuffling solutions have been developed where participants may provide their output addresses without any participant or external adversary being able to associate a participant to a specific output address.

Shuffling solutions include CoinShuffle (described in greater detail at Ruffing, T., Moreno-Sanchez, P., & Kate, A. (2014 September), "CoinShuffle: Practical decentralized coin mixing for Bitcoin"-European Symposium on Research in Computer Security (pp. 345-364), Springer International Publishing), CoinShuffle++ (described in greater detail at Ruffing, T., Moreno-Sanchez, P., & Kate, A. (2016)—"P2P missing and unlinkable Bitcoin transactions" NDSS'17., and Circle Shuffle.

Threshold Secret Share Voting

Referring to FIGS. 1 to 6, a method of making a decision on a blockchain is provided. The decision may be in the form of a desired course of action, a preferred candidate in an election, or any other decision. A number of participants, or voters, are provided with shares in respective secret values associated with one or more outcomes of the decision. The outcomes may be candidates up for election. The participants then vote for their preferred outcome, selection, or candidate, by providing to a first, or commitment, transaction 2 an input 4 containing a share associated with that outcome. The commitment transaction 2 (see FIG. 4) is arranged to be redeemable only upon provision of both a first signature (6a, 6b) associated with one of the outcomes, and a second signature (8a, 8b) associated with that outcome. In FIGS. 4 to 6, a signature for public key X is denoted σ(X). Upon provision of at least a threshold number of shares of a secret value, enough information is available to execute the second signature (8a, 8b), and therefore to satisfy the requirements of the commitment transaction 2 and reveal the outcome and/or enact the decision.

For the Threshold Secret Share Voting (TSSV) protocol one imagines a scenario where a set of participants $\{U_i\}$ have a choice of voting for one or more selections, or candidates. In this example, there are two candidates designated A and B. Each candidate has a main private-public key pair ((PrivA$_M$, PubA$_M$) and (PrivB$_M$, PubB$_M$)) where the public keys are made available to all voters. Each voter has one vote and a winning candidate is the candidate with:
the most votes,
AND enough votes past a specified threshold.

As an example, if there are to be 9 participants (voters) then the winning candidate can be asked to receive at least 5 votes.

In combination with their vote, voters are asked to commit to a certain amount of funds (e.g. bitcoins) alongside their vote. The accumulated committed funds from all voters will be given to the winning candidate. These funds may be seen as, or act as, a reward to the winner, or a disincentive for frivolous or malicious participation in the voting process.

The TSSV protocol uses three transactions. These transactions are labelled the Vote Commitment Transaction 2 (FIG. 4), Winners Payment (or Redemption) Transaction 10 (FIG. 5), and the Refund Transaction 12 (FIG. 6). These transactions have the following responsibilities.

Vote Commitment Transaction: The Vote Commitment Transaction (VCT) 2 is the transaction which contains both the bitcoin commitment and the vote commitment of each voter. For the proposed TSSV design, this transaction 2 comprises inputs 4 from the entire set of voters, though not all voters are required to provide votes. The VCT 2 records all user votes as well as pools the bitcoin commitments at one output 14. These votes are encrypted.

Refund Transaction: The Refund Transaction (RT) 12 is a failsafe measure for voters to recover their committed funds if a candidate is unable to collect the accumulated bitcoins of the voters before a specified time. The RT 12 is created and signed after users have voted and the VCT 2 has been created (but not submitted).

Winners Payment Transaction: The Winners Payment Transaction (WPT) 10, or redemption transaction, is the transaction that pays a winning candidate the accumulated bitcoins. The winning candidate will be the only person, candidate or otherwise, who would be able to collect the pooled bitcoins. FIG. 5 shows two possible redemption transactions 10a, 10b: (a) shows the redemption transaction 10a in the event that candidate A wins, and (b) shows the redemption transaction 10b in the event that candidate B wins.

A visual representation of the interplay between these three transactions 2, 10, 12 and the pooled bitcoins is shown in FIG. 1.

The Voting Commitment Transaction (VCT) 2 is the transaction that contains the user votes. Of the two commitments (vote and bitcoins) a voter must make for the VCT, the process of making the BTC funds is the one most easily understood and the one best facilitated by the Bitcoin protocol.

In the case of the bitcoin commitment, each user utilises the unspent BTC at a specific address they control/own and includes this as an input 4 of the commitment transaction 2, and signs their input 4. The voter's input 4 in the commitment transaction 2 is only signed by the voter provided that the voter is satisfied with the other available details of the commitment transaction 2. The refund transaction 12 should also have been signed by all relevant parties. Each user is expected to commit the same amount (xBTC) of bitcoins to their vote, though this is not essential.

In the case of the 'vote commitment', a vote $v_i$ by a voter $U_i$ for a candidate B in the context of the TSSV protocol is expressed as the concatenation of: a secret share $k_{B,i}$ of a key $k_B$ given to $U_i$; and an identification value for candidate B. The vote may be expressed in the following manner: $v_i = k_{B,i} \| \text{IDCandidateB}$ where $k_{B,i}$ is the share held by voter $U_i$ of the key $k_B$ and $\|$ represents concatenation.

The key share component of $v_i$ will play a part in allowing the candidate B to claim the accumulated committed funds of all voters if candidate B is able to garner sufficient votes. The vote $v_i$ is not necessarily embedded into the VCT 2 as it is; it is preferably first encrypted with the public key of the candidate the voter $U_i$ wants to vote for (Candidate B in this example). The encrypted vote can be represented as $\hat{v}_i = \text{Enc}_B(v_i)$.

In the event that candidate B attempts to decrypt $\hat{v}_i$, the component IDCandidateB serves as an indicator to candidate B that they have done the decryption successfully. The bit size of IDCandidateB should be large enough that it is unlikely that an incorrect decryption (private) key will produce from the ciphertext $\hat{v}_i$ the value string$\|$IDCandidateB.

Given that Bitcoin transactions do not have fields dedicated to the storage of metadata, the success of the TSSV protocol is dependent on finding a suitable location for recording the votes of the participants. Given that the design of the protocol is such that all votes are represented in one commitment transaction (the VCT 2), this adds some restrictions on incorporating the set of vote commitments.

For the proposed design of the TSSV protocol, the votes are stored using Bitcoin's script for an m-of-n multi-signature transaction. The m-of-n multi-signature script takes the following format:

OP_0 Sig1 Sig2 . . . . NumSigs Pub1 Pub2 Pub3 Pub4 . . . NumKeys OP_CHECKMULTSIG where the content in bold would be of the <scriptPubKey> and the content underlined is of the <scriptSig>. <scriptPubKey> is the ruleset that allows for a transaction output to be utilised. <scriptSig> is the content required that would satisfy <scriptPubKey>. NumSigs is the number of required signatures, NumKeys is the number of possible signatures, and PubX is the public key that corresponds to the signature SigX. While this script is intended for m-of-n signatures, the PubX elements of the redeem script may be appropriated for use as a store of metadata.

As an example, a 2-of-4 multi-signature script is shown where of the 4 data elements reserved for Public Keys two are utilised to store metadata. The script takes the following format:

OP_0 SigA SigB OP_2 meta1 meta2 PubA PubB OP_4 OP_CHECKMULTSIG

For our purposes, these metadata elements could be representative of the set of encrypted votes $\{\hat{v}_i : i \in [1, n]\}$ of users.

As an example, a 1-of-7 multi-signature script is shown where, of the seven data elements reserved for Public Keys, five are utilised to store encrypted votes and two for genuine public keys. The script takes the following format:

OP_0 SigB OP_1 $\hat{v}_1$ $\hat{v}_2$ $\hat{v}_3$ $\hat{v}_4$ $\hat{v}_5$ PubA PubB OP_7 OP_CHECKMULTSIG For the current version of the Bitcoin protocol, the maximum number of public keys allowable in a multisig output is 15. For this reason, the maximum number of votes (voters) that the described m-of-n script may allow is thirteen (bearing in mind that two positions (of the 15) are reserved for the public keys of the candidates A or B). At least 2 public keys are attached to each candidate (e.g. Candidate A), a main public key and the collaboratively derived public key based on the kai key shares. However, importantly, multiple m-of-n multisig scripts can be utilised within one larger script. As an example, if-else conditions could be utilised within the script to determine which candidate gets paid. Each of the options within the script may have its own m-of-n segment within the script, leading to the inclusion of at least 26 possible votes. More elaborate scripts may be constructed to incorporate more votes, keeping in mind however, that the maximum size of the script is currently 10 kilobytes (as explained in more detail in Bitcoin Script Interpreter) and that transaction costs are dependent on the size of the transaction.

The use of the public key elements of the m-of-n bitcoin script requires that consideration be given to the size restrictions placed on of a public key for the Bitcoin protocol. This is bearing in mind that that the public key is being appropriated for storing $\hat{v}_i$ where $\hat{v}_i$ is of the same bit length and is the encryption of $v_i = h_{B,i} \| \text{IDCandidateB}$.

It should be noted that for the TSSV protocol being proposed, the Bitcoin elliptic curve digital signature algorithm (ECDSA) signature (that is ultimately required for the winning candidate to claim their funds) requires a 256-bit private key. To reconstruct a 256-bit (32 bytes) private key requires that the key shares themselves also be 256 bits in length.

The Bitcoin protocol utilises Elliptic Curve (EC) (of 256 bit length) encryption where the public key kG is a point on the curve; each coordinate being of 256 bits. This is described in more detail at Franco, P., 2014. *Understanding Bitcoin: Cryptography, engineering and economics*. John Wiley & Sons. The Bitcoin protocol allows for representation of the EC public key as a compressed or uncompressed point. For the compressed point only the x-value (256 bits) of the EC point is stored, whereas for the uncompressed point both the x and y values are stored (each being of 256 bits).

The implication of this is that, if the uncompressed public key is utilised in the m-of-n script, there is enough storage space for the concatenation of a 256-bit key share and the candidate ID. The 256 bits of the EC point's x-value may be used for the key share $k_{B,i}$ whereas the other 256 bits reserved for the y-value may be utilised to store the candidate ID.

In voting systems, it is usually desirable that a user's vote not be traced to the voter. For the proposed TSSV protocol, if a voter simply adds their $\hat{v}_i$ to the set/list of existing vis then another voter may, on its own or collaboratively, determine the voter's $\hat{v}_i$. Consider the case where the first voter adds their $\hat{v}_i$ to the list of votes. The second voter will easily be able to tell the (encrypted) vote already in the list is that of the first voter. While this only lets one know the ciphertext $\hat{v}_i$ and not $v_i$ itself, this puts a malicious voter/participant in a better position to link a voter to a $v_i$.

More importantly, vote shuffling prevents the candidates (A or B) from linking a voter to a vote, given that the encryption of a vote is done with a public key of one of the two candidates. If there was no shuffling, a candidate with the aid of one or more voters, may be able to link a voter to a vote, given that a candidate can decrypt $\hat{v}_i$. It should also be noted that, given there being only two candidates in a TSSV protocol, a candidate not being able to decrypt a vote implies that the vote is for the other candidate.

For this reason, for the TSSV protocol, a shuffling solution is incorporated into the process of users providing their votes to the <scriptPubKey>. Examples of shuffling solutions are described above; any of which may be utilised in an instance of a TSSV protocol. The fundamental responsibility of a shuffling solution utilised for TSSV purposes is to allow for each voter to provide their (encrypted) vote without any other voter or non-voter being able to determine which (encrypted) vote originates from which voter.

Therefore the set of encrypted votes $\{\hat{v}_1, \hat{v}_2, \ldots, \hat{v}_{n-1}, \hat{v}_n\}$ may be created without any voter or candidate (or otherwise) knowing which element of the set originated from which voter.

The TSSV protocol is designed in such a way that only the successful candidate would be able to collect the pooled bitcoins. This restriction is facilitated by the threshold secret schemes where, for such schemes, t+1 shares of a set of shares $\{k_i : i \in [1, n]\}$ may be used to determine a secret k. t is the degree of the polynomial used to calculate the secret key shares.

Each of the two candidates (A and B) is assigned a public key.

$$\text{PubA} = k_A G$$

$$\text{PubB} = k_B G$$

where G is the base point of the Elliptic Curve (EC) and kG is an example of EC 'point-multiplication-by-scalar'. G is a base point on EC and k is a scalar value.

The values of $k_A$ and $k_B$ are unknown (by anyone, candidate or voter) at the earlier stages of the protocol. These $k_A$ and $k_B$ values can only be determined when users have submitted a sufficient number of votes for a particular candidate. These user votes contain a key share of $k_A$ or $k_B$ depending on the voter's candidate of choice. The key shares of $k_A$ and $k_B$ are such that:

$$k_A = f(k_{A,1}, k_{A,2}, \ldots, k_{A,n})$$

$$k_B = f(k_{B,1}, k_{B,2}, \ldots, k_{B,n})$$

As an example, a voter's vote commitment, if they choose to vote for candidate B, would be $$v_i = k_{B,i} \| \text{IDCandidateB}$$

The value $k_{B,i}$ is a key share of the key $k_B$, a share that would have been previously distributed to voter $U_i$.

The distribution of key-shares in theory can be dealer-based or dealer-less. In a dealer-based distribution, the dealer knows $k_A$ and $k_B$ and distributes the key shares of both $k_A$ and $k_B$. A participant in possession of a share $k_{B,i}$ and a share $k_{A,i}$ may be considered as a legitimate participant. This dealer must not be any of the candidates and is instead a third party. If candidates A or B were dealers, either candidate could sign the output of the TSSV, collecting all the pooled funds despite not winning the necessary votes, given that the malicious candidate would have known all the secret keys. For the dealer-less implementation, each voter constructs their own key share. Voters collaborate using Secret Share Joining, as described above, to calculate the public keys $\text{PubA} = k_A G$ and $\text{PubB} = k_B G$.

A PVSS scheme is utilised for candidates and voters to validate the key shares in light of PubA and PubB. Having a dealer distribute the key shares gives an appropriate authority control over the list of eligible voters; this is as the ownership of a key share can be seen as a certification of voting eligibility.

If candidate B is able to obtain sufficient votes ($k_{B,i}$ shares), candidate B will be able to construct the secret $k_B$ and utilise this $k_B$ in signing the output of the Voting Commitment Transaction 2 in order collect the pooled committed bitcoins.

The degree of the polynomial, for an implementation of Shamir's Secret Sharing, must be chosen in light of the number of voters and the number of votes necessary for a candidate to win. The winning candidate must achieve the most votes and the number of votes the winning candidate receives must also be greater than a specified threshold. As an illustration, FIG. 2 shows the number of votes necessary for a candidate to win and the degree of the polynomial for varying amounts of voters. The minimum votes necessary for the winning candidate may be higher if a larger threshold is desired. As an example, a government referendum may require both a majority and at least 75% of the votes for a policy proposal to be accepted.

To collect the winnings, a winning candidate B needs to provide more than the signature 8b for PubB (FIG. 4). In addition to having being assigned the public key PubA/PubB for which the corresponding private keys are split, candidates A and B both respectively possess their own separate (main) public keys $PubA_m$ and $PubB_m$. Candidate A knows the private key for $PubA_m$ and Candidate B knows the private key for $PubB_m$.

The need for this extra public key is due to the fact that any set of t+1 voters could theoretically collaborate, calculate $k_B$, and steal the accumulated funds. This is due to the fact that there would not be the requirement for a signature 6b based on the extra public key—more so its private key (corresponding to public key) which would be only known to the candidate. For this reason, a signature 6b of the winning candidate for a public key $pubB_M$ is also necessary in order for the winning candidate (candidate B) to claim the accumulated funds.

With this in mind we consider the different ways, as per the bitcoin script, in which the pooled bitcoins can be claimed. The <scriptPubKey> of the Voting Commitment Transaction 2 includes consideration for three ways of collecting payment.

The first of these rulesets ('ruleset' can be interpreted as a Boolean sub-function (of the main <scriptPubKey> function) is represented in the <scriptPubKey> by the subscript OP_DUP OP_HASH160<Hash (PubS)>OP_EQUALVERIFY OP_CHECKSIG The term subscript here is used to describe a segment of a larger script. In this case, the larger script being referred to is the <scriptPubKey>. This script shows a basic way in which most bitcoin transaction outputs are protected; it simply requires the signature for the included public key. For the Vote Commitment Transaction (VCT) 2, this subscript controls the ability of users to obtain a refund of their committed bitcoins if the execution of the TSSV protocol does not go as planned, i.e. if there is no winning selection or if the winning selection does not redeem the vote commitment transaction. Successful submission of the Refund Transaction 12 to the blockchain depends on the <scriptSig> containing the signature for a public key PubS. This public key can either be a public key that one of the voters is able to sign or it could be public key based on a separate set of distributed key shares. For the latter option, obtaining the signature of PubS would be a collaborative effort between at least t+1 voters to construct the private key and generating the signature. Note that:

A copy of the signed refund transaction 12 is available to all voters prior to the VCT 2 being submitted to the blockchain.

the Refund Transaction 12 includes an nLockTime value which prevents the submission of the Refund Transaction 12 to the blockchain unless a specified point in time (such as Unix time or block height) has passed.

the Refund Transaction 12 returns to each user the bitcoins that user committed.

The second ruleset of these options of claiming pooled funds of the VCT 2 is one such that Candidate A is able to claim the pooled funds depending on Candidate A's ability to produce two required signatures 6a, 8a (FIG. 4). The subscript (shown below) is a 2-of-15 multisig, i.e. it requires signatures that correspond with two public key fields found within a set of fifteen public key fields. There could be fewer than 15 fields if there are less than 13 voters.

OP_2<$\hat{v}_1$> <$\hat{v}_2$> . . . <$\hat{v}_{12}$> <$\hat{v}_{13}$> <PubA> <$PubA_m$>OP_15 OP_CHECKMULTSIG This subscript serves dual purposes. The first of these responsibilities is to contain (at most 13 of) the encrypted votes and the second is to allow Candidate A to claim the pooled bitcoins if he is able to produce the respective signatures 8a, 6a of the public keys PubA and $PubA_m$. PubA=$k_A$G and the signature 8a of PubA is obtained using the secret values found within the $\hat{v}_1$ values in order to find $k_A$. This of course depends on there being enough votes for Candidate A within the script. Each vote for candidate A has a key share $k_{A,i}$ and is encrypted with a public key of Candidate A (preferably $PubA_m$). $PubA_m$ is a public key generated by Candidate A and therefore Candidate A should be able to produce the signature 6a for this (main) public key. The signature 6a of $PubA_m$ is Candidate A's responsibility as it was Candidate A who would have generated $PubA_m$, and would this be in possession of $PubA_m$'s corresponding private key $PrivA_M$.

The third ruleset is of similar content as the second, and is intended to contain additional votes as well as to grant or deny Candidate B the ability to claim the VCT funds based on the provision of at least two signatures. This is shown below OP_2<$\hat{v}_{13}$> <$\hat{v}_{14}$> . . . <$\hat{v}_{25}$> <$\hat{v}_{26}$> <PubB> <$PubB_m$>OP_15 OP_CHECKMULTSIG In this case, in the m-of-n subscript, there are once again at most 13 fields appropriated for votes/metadata while two fields are assigned for usage as legitimate public keys. The public keys which do in fact require signatures are PubB and $PubB_m$. PubB=$k_B$G is the public key which corresponds with the $k_{B,i}$ shares. At least t+1 votes for candidate B being present in the m-of-n scripts for Candidate B would allow Candidate B to utilise the $k_{B,i}$ key shares to produce a signature 8b for PubB. Candidate B generated $PubB_m$ and therefore should be able to produce its signature 8a. Provision of both of these signatures 8a, 8b would allow Candidate B to collect pooled bitcoins of the Voting Commitment Transaction 2.

It should be noted that:

It does not matter in which of the two m-of-n subscripts the encrypted votes are found; all $\hat{v}_i$ are visible in the blockchain to both candidates, and both candidates can try to decrypt $\hat{v}_i$ from either Candidate A or Candidate B's m-of-n subscript, in an effort to retrieve key shares of the their public keys for which signatures are required.

t+1 is the threshold amount of votes that a candidate requires in order to win, where t is the degree of the polynomial used in a polynomial-based secret sharing mechanism.

t would be chosen such that t+1 is guaranteed to be the majority of votes where it is a choice between two candidates.

Referring to FIG. 3, a flowchart illustrating a process 300 embodying the present invention is shown. Initially, at step 302, a decision is made on the number of voters, n. Using the key sharing techniques described above, at step 304, n shares are created for a private key $k_A$. Similarly, n shares are created for a key $k_B$. These private keys correspond to public keys PubA and PubB respectively.

Each voter is then given a unique share $k_{A,i}$ of $k_a$ and a unique share of $k_{B,i}$ of $k_B$ at step 306. The voters then collaborate at step 308 using $k_{A,i}$ key shares to calculate PubA=$k_A$G using secret share joining, and similarly collaborate using $k_{B,i}$ key shares to calculate PubB=$k_B$G. PubA and PubB are then communicated at step 310 to all voters and candidates and a key share scheme is used to validate the key shares in light of PubA and PubB. The candidates A and B then each create separate main public keys $PubA_m$ and $PubB_m$ respectively at step 312.

At step 314, each voter votes by concatenating its secret share with the ID of its candidate of choice to provide $$v_i = k_{B,i} \| \text{IDCandidateB}$$

At step 316, each voter then encrypts its vote with the public key of its candidate of choice. For example, in the case of candidate B the encrypted vote is:

$$\hat{v}_i = Enc_B(v_i)$$

Each voter contributes its vote to a list at step 318, this being done using a shuffling technique as described above so that there is no link to the user and the vote. The voter commitment transaction 2 is then created at step 320. This includes inputs from each voter. Each voter contributes an amount xBTC of Bitcoin.

At step 322, the output of the voter commitment transaction 2 of the value nxBTC, is governed by an m-of-n script from which pubkey elements are appropriated for their use as the stores of encrypted votes. This output script of the voter commitment transaction 2 allows for:
 a refund of xBTC to each voter
 candidate A to collect xBTC using signatures $\sigma(A_m)$ and $\sigma(A)$
 candidate B to collect nxBTC using signatures $\sigma(B_m)$ and $\sigma(B)$ The refund transaction 12 is then created at step 324, signed and a copy distributed to each voter. The voter commitment transaction 2 is then submitted to the blockchain.

At step 326, candidate B tries to decrypt all of the $\hat{v}_i$ values. If the decryption process reveals candidate B's ID as the latter segment of $v_i$, then candidate B recognises the first segment of $v_i$ as a secret share $k_{B,i}$. If candidate B receives enough votes (shares), he can sign the output. Candidate A carries out a substantially identical process to that carried out be candidate B.

Finally, if at step 328 neither candidate is able to claim their winnings prior to the nLockTime of the refund transaction 12, the refund transaction 12 is submitted, by any voter, and each voter's committed funds are returned to the voter, minus transaction costs.

Turning now to FIG. 7, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes clock 2624, main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method of making a decision on a blockchain, the method comprising:
   providing a first blockchain transaction having an output redeemable by means of a first signature associated with a selection of a candidate from a plurality of candidates by a plurality of participants and a second signature associated with the selection, wherein the first signature is a signature using a private key of said selected candidate;
   providing each of said plurality of participants with at least one share of each of a plurality of secret values, wherein a threshold number of shares of one of said secret values is required in order to produce said second signature, wherein each of said plurality of secret values is associated with a respective one of said plurality of candidates; and
   submitting the first blockchain transaction to the blockchain.

2. The method of claim 1, wherein at least one participant adds to the first blockchain transaction at least one signed input representative of a cryptographic asset.

3. The method of claim 2, further comprising the step of providing a second blockchain transaction redeemable, upon satisfaction of a locktime condition, to return at least a portion of the cryptographic asset to the at least one participant.

4. The method of claim 1, wherein the first blockchain transaction comprises an m-of-n multisignature redeem script, and wherein at least one share of a corresponding secret value of the plurality of secret values is added to the redeem script.

5. The method of claim 4, wherein the at least one share is encrypted with a first public key of at least one candidate of said plurality of candidates.

6. The method of claim 5, further comprising the step of combining the at least one share with identification data identifying the at least one candidate prior to encryption with the first public key.

7. The method of claim 6, wherein the combination comprises concatenation of the at least one share and the identification data.

8. The method of claim 1, wherein the step of providing the shares to the participants comprises at least one of: (i) a dealer entity providing the shares to the participants; and (ii) the participants generating the shares among themselves.

9. The method of claim 1, comprising the step of obscuring which participant provides which share prior to submission of the first blockchain transaction to the blockchain.

10. The method of claim 1, further comprising the step of providing a third blockchain transaction arranged to redeem the first blockchain transaction.

11. The method of claim 1, further comprising the step of validating at least one share of a corresponding secret value of the plurality of secret values using at least one second public key.

12. The method of claim 11, wherein the plurality of participants collaborate in combining at least one subset of shares to determine said at least one second public key.

13. A computer-implemented system comprising:
   a processor; and
   memory including executable instructions that, as a result of execution by the processor, causes the system to perform any embodiment of the computer-implemented method as claimed in claim 1.

14. A non-transitory computer-readable storage medium having stored thereon executable instructions that, as a result of being executed by a processor of a computer system, cause the computer system to at least perform an embodiment of the method as claimed in claim 1.

15. The method of claim 1, wherein:
   a first secret value of said plurality of secret values is reconstructed from a plurality of shares provided by a set of said participants; and
   the first secret value is used to generate the second signature.

16. The method of claim 1, wherein the threshold number of shares of one of said secret values is usable to produce said second signature.

17. The method of claim 1, wherein the threshold number of shares of one of said secret values is used to generate said second signature.

* * * * *